H. COOPER.
FLEXIBLE SHAFTING.
APPLICATION FILED MAY 10, 1915.
1,201,561.
Patented Oct. 17, 1916.
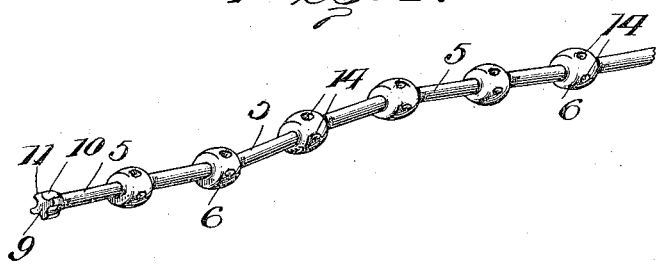
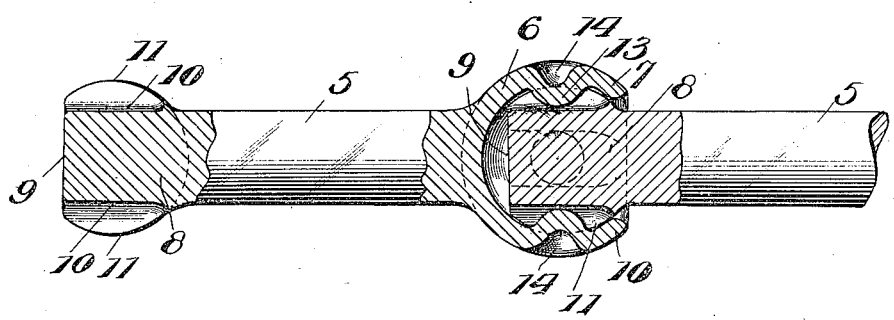
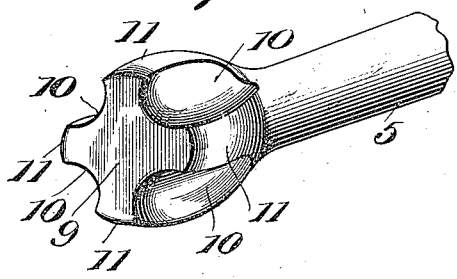
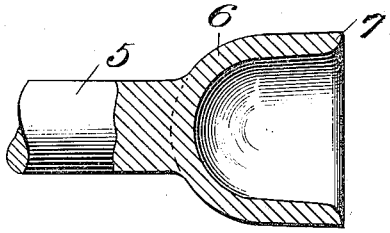
Witnesses
Inventor
Herbert Cooper
By
Attorney

UNITED STATES PATENT OFFICE.

HERBERT COOPER, OF BROOKLYN, NEW YORK.

FLEXIBLE SHAFTING.

1,201,561. Specification of Letters Patent. Patented Oct. 17, 1916.

Application filed May 10, 1915. Serial No. 27,112.

*To all whom it may concern:*

Be it known that I, HERBERT COOPER, a citizen of the United States, residing at Brooklyn, in the county of Kings and State of New York, have invented certain new and useful Improvements in Flexible Shafting, of which the following is a specification.

This invention relates to flexible shafting and more particularly to that class of such devices especially adapted for the transmission of power.

The primary object of this invention is to provide a flexible shafting of the character set forth which shall freely transmit power furnished thereto.

A further object of this invention is to so construct a flexible shafting as to permit of a maximum freedom of movement in any deviation from a straight line or in any driving curve or angle.

A still further object of this invention is the constructing of a shaft unit for flexible shafts adapted to form a simple and complete device.

With these and other objects in view as will hereinafter appear, this invention consists in the peculiar combination and arrangement of the various related elements of a flexible shafting as hereinafter set forth and more particularly designated in the appended claim.

Referring to the accompanying drawings forming a portion of this specification and in which similar reference characters indicate similar parts wherever used, Figure 1 is a perspective view of a portion of the flexible shafting made in accordance with my invention; Fig. 2 is a detail, partly in section, of one of the shaft members engaged by a second shaft member; Fig. 3 is a fragmentary detail perspective view of the ball end of one of the shaft members; Fig. 4 is a fragmentary section of the unfinished socket end of one of the shaft members.

The numeral 5 designates a shank provided at one end with an integral socket 6 formed in any desirable manner and having a lip 7 normally extending in a plane parallel to the shank 5. The opposite end of the shank 5 is enlarged to form a ball head 8 flattened at 9 and provided with cut out portions 10 forming radial projections 11.

The shaft members, just described, are assembled to form a flexible shafting as follows: The head 8 of one of the shaft members is inserted into the socket 6 of another shaft member and by means of a punch or similar tool projections 13 are formed upon the inner side of the socket shell by punching a similar depression 14 upon the outer surface thereof. These projections engage the cut out portions 10 of the head 8. The lip 7 is then swayed or burnished over in the position shown in Fig. 2, the inner face of the socket shell fitting the curve of the projection 11 of the head 8, thus forming a universal joint.

Shafting constructed in accordance with this invention forms an extremely serviceable and satisfactory mechanism adapted to resist wear and strain and to minimize friction.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claim.

Having thus described my invention what I claim as new and desire to secure by Letters Patent is:

In a flexible shafting, in combination, a plurality of similar shaft members, each comprising a shank having at one end a socket having a plurality of indented substantially semi-spherical projections, and at its other end a head adapted to fit an adjacent socket, said head having alternate cut out portions and radial shoulders adapted to have a coactive and interfitting relation with said indented projections, said shoulders being longitudinally curved, and said socket being crimped over to fit the curved shoulders of an adjacent head and having a substantially spherical interior to retain the head and form a universal joint connection therewith.

In testimony whereof I affix my signature in presence of two witnesses.

HERBERT COOPER.

Witnesses:
 GORDON D. CAMPBELL,
 ARTHUR COOPER.